(12) United States Patent
Bluvband et al.

(10) Patent No.: US 9,006,119 B2
(45) Date of Patent: Apr. 14, 2015

(54) COMPOSITE MATERIAL, A STRUCTURAL ELEMENT COMPRISED OF THE COMPOSITE MATERIAL, AN AIRPLANE WING SPAR AND THEIR METHODS OF PRODUCTION

(75) Inventors: Zigmund Bluvband, Rishon Lezion (IL); Viktor Shkatov, Bat-Yam (IL)

(73) Assignee: A.L.D. Advanced Logistics Development Ltd., Tel Aviv (IL)

( * ) Notice: Subject to any disclaimer, the term of this patent is extended or adjusted under 35 U.S.C. 154(b) by 0 days.

(21) Appl. No.: 12/833,985

(22) Filed: Jul. 11, 2010

(65) Prior Publication Data

US 2011/0147045 A1      Jun. 23, 2011

Related U.S. Application Data

(63) Continuation-in-part of application No. 12/571,832, filed on Oct. 1, 2009.

(51) Int. Cl.
*B32B 15/14* (2006.01)
*B23B 3/22* (2006.01)
*B32B 27/36* (2006.01)
(Continued)

(52) U.S. Cl.
CPC . *B23B 3/22* (2013.01); *B32B 27/36* (2013.01); *B32B 15/14* (2013.01); *B64C 3/20* (2013.01); *B64C 3/185* (2013.01); *B32B 5/12* (2013.01); *B32B 3/18* (2013.01); *B32B 2305/08* (2013.01); *B32B 2305/18* (2013.01); *B32B 2305/38* (2013.01); *B32B 2307/54* (2013.01); *B32B 2309/10* (2013.01); *B32B 2309/105* (2013.01); *B32B 2605/18* (2013.01);

(Continued)

(58) Field of Classification Search
USPC ........ 244/123.1, 123.5, 123.8, 123.9, 123.12, 244/133
See application file for complete search history.

(56) References Cited

U.S. PATENT DOCUMENTS 3,764,277 A * 10/1973 Hollis et al. ................. 428/555
4,403,064 A * 9/1983 Heine ........................... 524/494
(Continued)

FOREIGN PATENT DOCUMENTS

CN      1994611 A      11/2007
GB      2041824 A      9/1980
(Continued)

OTHER PUBLICATIONS http://www.engineering-dictionary.org/NCRS-Construction-Dictionary/rebar, NCRS Construction Dictionary, "Rebar", Copyright 2008.*

(Continued)

*Primary Examiner* — Angela Ortiz
*Assistant Examiner* — Klee S Simmons
(74) *Attorney, Agent, or Firm* — Vladimir Sherman; Professional Patent Solutions

(57) ABSTRACT

Disclosed is to a composite material, a structural element comprised of the composite material, an airplane wing spar and their methods of production. Some embodiments of the present invention include composite materials comprised of multiple layers of arrays of metallic bodies separated by layers of non-metallic material, wherein the orientation of metallic bodies in some metallic layers is structurally complementing to the orientation of metallic layers in adjacent metallic layers. Other embodiments of the present invention include structural elements, such as an airplane wing spar, comprised of the composite material.

22 Claims, 15 Drawing Sheets

(51) Int. Cl.
  *B64C 3/20*    (2006.01)
  *B64C 3/18*    (2006.01)
  *B32B 5/12*    (2006.01)
  *B32B 3/18*    (2006.01)

(52) U.S. Cl.
  CPC ...... *B32B 2262/02* (2013.01); *B32B 2262/101* (2013.01); *B32B 2262/106* (2013.01); *B32B 2457/00* (2013.01)

(56) References Cited

U.S. PATENT DOCUMENTS

| | | | |
|---|---|---|---|
| 4,822,665 A * | 4/1989 | Scholz et al. | 428/222 |
| 5,137,766 A * | 8/1992 | Mazanek et al. | 428/68 |
| 5,429,326 A * | 7/1995 | Garesche et al. | 244/133 |
| 5,484,963 A | 1/1996 | Washino | |
| 5,847,375 A | 12/1998 | Matsen et al. | |
| 6,114,050 A * | 9/2000 | Westre et al. | 428/608 |
| 2002/0066257 A1 * | 6/2002 | Sanchez et al. | 52/782.1 |
| 2005/0150596 A1 * | 7/2005 | Vargo et al. | 156/324 |
| 2006/0108059 A1 | 5/2006 | Modin et al. | |
| 2006/0138279 A1 | 6/2006 | Pisarski | |
| 2007/0012748 A1 * | 1/2007 | McCrink et al. | 228/101 |
| 2008/0271999 A1 | 11/2008 | Jones et al. | |
| 2008/0286989 A1 * | 11/2008 | Strauss | 439/55 |
| 2009/0294009 A1 | 12/2009 | Barguet et al. | |

FOREIGN PATENT DOCUMENTS

| | | |
|---|---|---|
| WO | 85/03683 A1 | 8/1985 |
| WO | 94/01277 A1 | 1/1994 |
| WO | 00/56541 A1 | 9/2000 |
| WO | 2005/087589 A1 | 9/2005 |
| WO | 2007/145512 A1 | 12/2007 |
| WO | 2010/034594 A1 | 4/2010 |

OTHER PUBLICATIONS

Chinese Application No. 201180043720.0 Official Action dated Sep. 29, 2014 (11 pages).

European Application No. 11806379.1 Supplementary European Search Report dated Oct. 16, 2014 (10 pages).

* cited by examiner

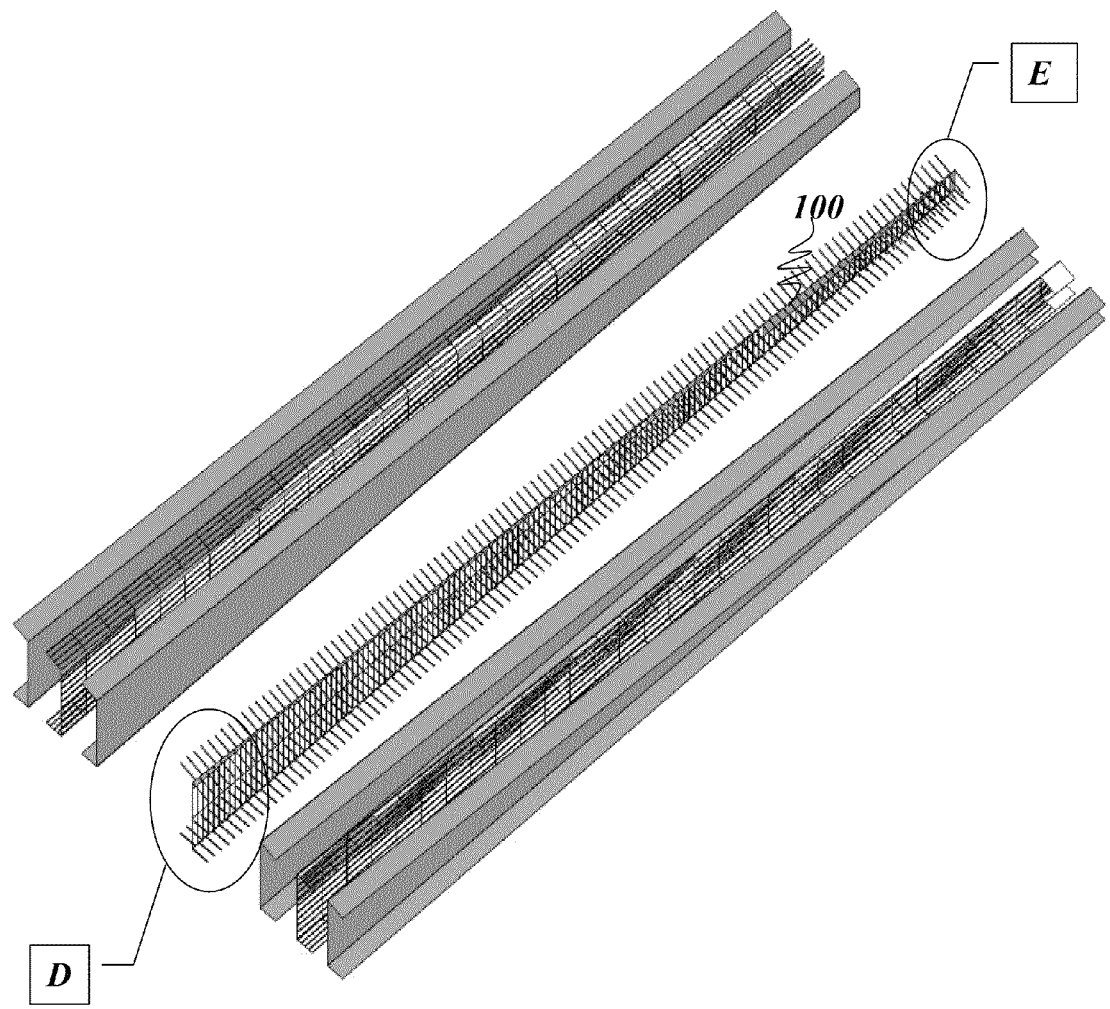
Fig. 2A
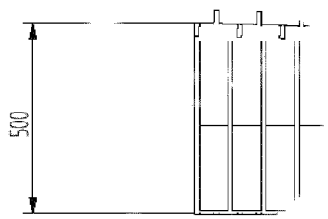 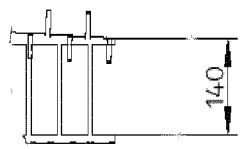
Fig. 2B	Fig. 2C

COMPOSITE MATERIAL, A STRUCTURAL ELEMENT COMPRISED OF THE COMPOSITE MATERIAL, AN AIRPLANE WING SPAR AND THEIR METHODS OF PRODUCTION

PRIORITY CLAIMS

This application claims priority from:
U.S. patent application Ser. No. 12/571,832, titled "Armor Plate and Method of Producing Same", filed by the inventors of the present invention on Oct. 1, 2009, which is hereby incorporated into the present description in its entirety.

FIELD OF THE INVENTION

The present invention relates generally to the field of composite materials. More specifically, the present invention relates to a composite material, a structural element comprised of the composite material, an airplane wing spar and their methods of production.

BACKGROUND

Composite materials (or composites for short) are engineered materials made from two or more constituent materials with significantly different physical or chemical properties which remain separate and distinct on a macroscopic level within the finished structure.

Wood is a natural composite of cellulose fibers in a matrix of lignin. The most primitive manmade composite materials were straw and mud combined to form bricks for building construction; the Biblical Book of Exodus speaks of the Israelites being oppressed by Pharaoh, by being forced to make bricks without straw being provided. The ancient brick-making process can still be seen on Egyptian tomb paintings in the Metropolitan Museum of Art. The most advanced examples perform routinely on spacecraft in demanding environments. The most visible applications pave our roadways in the form of either steel and aggregate reinforced portland cement or asphalt concrete. Those composites closest to our personal hygiene form our shower stalls and bath tubs made of fiberglass. Solid surface, imitation granite and cultured marble sinks and counter tops are widely used to enhance our living experiences.

Composites are made up of individual materials referred to as constituent materials. There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The physical properties of composite materials are generally not isotropic (independent of direction of applied force) in nature, but rather are typically orthotropic (different depending on the direction of the applied force or load). For instance, the stiffness of a composite panel will often depend upon the orientation of the applied forces and/or moments. Panel stiffness is also dependent on the design of the panel. Moreover, some composites are brittle and have little reserve strength beyond the initial onset of failure. The best known failure of a brittle ceramic matrix composite occurred when the carbon-carbon composite tile on the leading edge of the wing of the Space Shuttle Columbia fractured when impacted during take-off. It led to catastrophic break-up of the vehicle when it re-entered the Earth's atmosphere on Feb. 1, 2003. Other, more recent, aviation disasters have also been tied to these problems. It would therefore be desirable to provide a more durable and, perhaps, more isotropic composite material for these types of implementations.

SUMMARY OF THE INVENTION

The present invention is a composite material, a structural element comprised of the composite material, an airplane wing spar comprised of the composite material and their methods of production. According to some embodiments of the present invention, a composite material may be comprised of multiple metallic layers comprised of arrays of metallic bodies separated by one or more non-metallic layers comprised of one or more plies of non-metallic material, such as a polymer fabric. According to further embodiments of the present invention, metallic bodies in some of the metallic layers may be arranged in an orientation structurally complementing an orientation of metallic bodies in some of the other metallic layers, for example in a substantially perpendicular orientation.

According to further embodiments of the present invention, a structural element, such as an aircraft wing spar [as shown in FIG. 2], deck floor, fuselage part, bally, bulkhead, helicopter parts, etc., and a method for producing the same may be provided. The structural element may be comprised of multiple metallic layers, each being comprised of an array of metallic bodies, wherein the metallic layers may be separated by non-metallic layers, each comprised of one or more plies of non-metallic material, such as polymer fabric. According to further embodiments of the present invention, metallic bodies in some of the metallic layers may be arranged in an orientation structurally complementing an orientation of metallic bodies in some of the other metallic layers, for example in a substantially perpendicular orientation. Different relative orientations may be optimal for different applications of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A: is an illustration of an exemplary Base Frame aligned with corresponding Flanks, wherein the layers of the flanks are shown, in accordance with some embodiments of the present invention.

FIG. 2B: is an illustration of an exemplary detail of portion D of the exemplary Base Frame shown in FIG. 2A, in accordance with some embodiments of the present invention.

FIG. 2C: is an illustration of an exemplary detail of portion E of the exemplary Base Frame shown in FIG. 2A, in accordance with some embodiments of the present invention.

Figure 1:
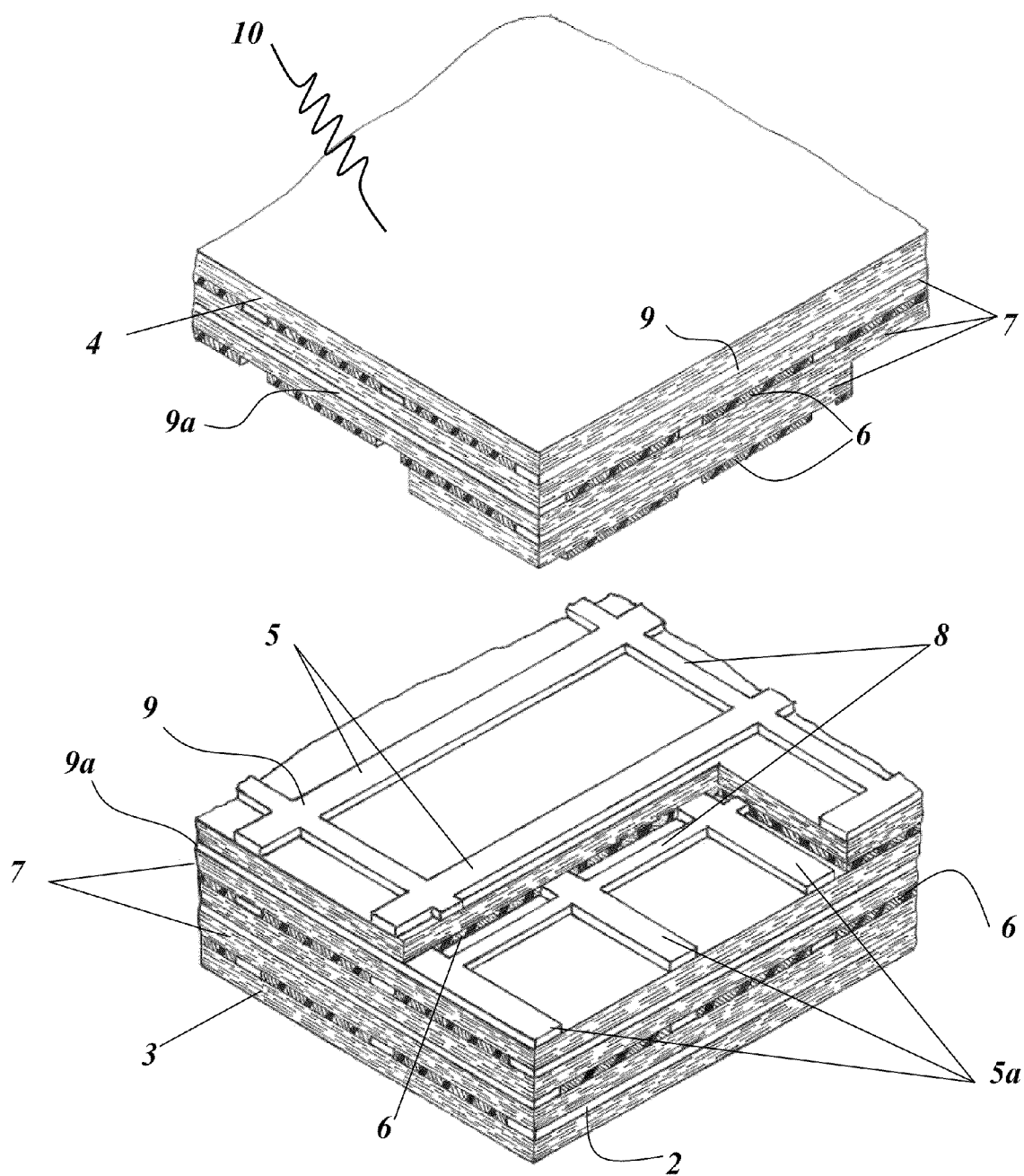
FIG. 1: is an illustration of an exemplary composite material, cut through the center, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description references to the figures appear in brackets. Numbers or letters appearing in brackets, e.g. [500], excluding paragraph numbers, should be understood to refer to elements marked within the figures by the same number or letter which appears in the brackets.

The present invention is a composite material, a structural element comprised of the composite material, an airplane wing spar comprised of the composite material and their methods of production. According to some embodiments of the present invention, there may be provided a composite material composed of layers of dissimilar materials and configuration affixed to one another, and a method of producing same. The composite material may include multiple metallic layers comprised of arrays of oblong metallic bodies separated by one or more non-metallic layers comprised of one or more plies of non-metallic material, such as a polymer fabric. According to further embodiments of the present invention, metallic bodies in some metallic layers may be arranged in an orientation structurally complementing an orientation of metallic bodies in other metallic layers, for example in a substantially perpendicular orientation. Structurally complementing=increasing the structural integrity and/or structural strength of, e.g. increasing the structure's ability to withstand pressure or impact or causing the structure to have isotropic properties. According to yet further embodiments of the present invention, some metallic layers may be interconnected with one or more other metallic layers, for example, with one or more cross-layer structures, or with any other interconnection structure or technique known today or to be devised in the future.

Figure 4:
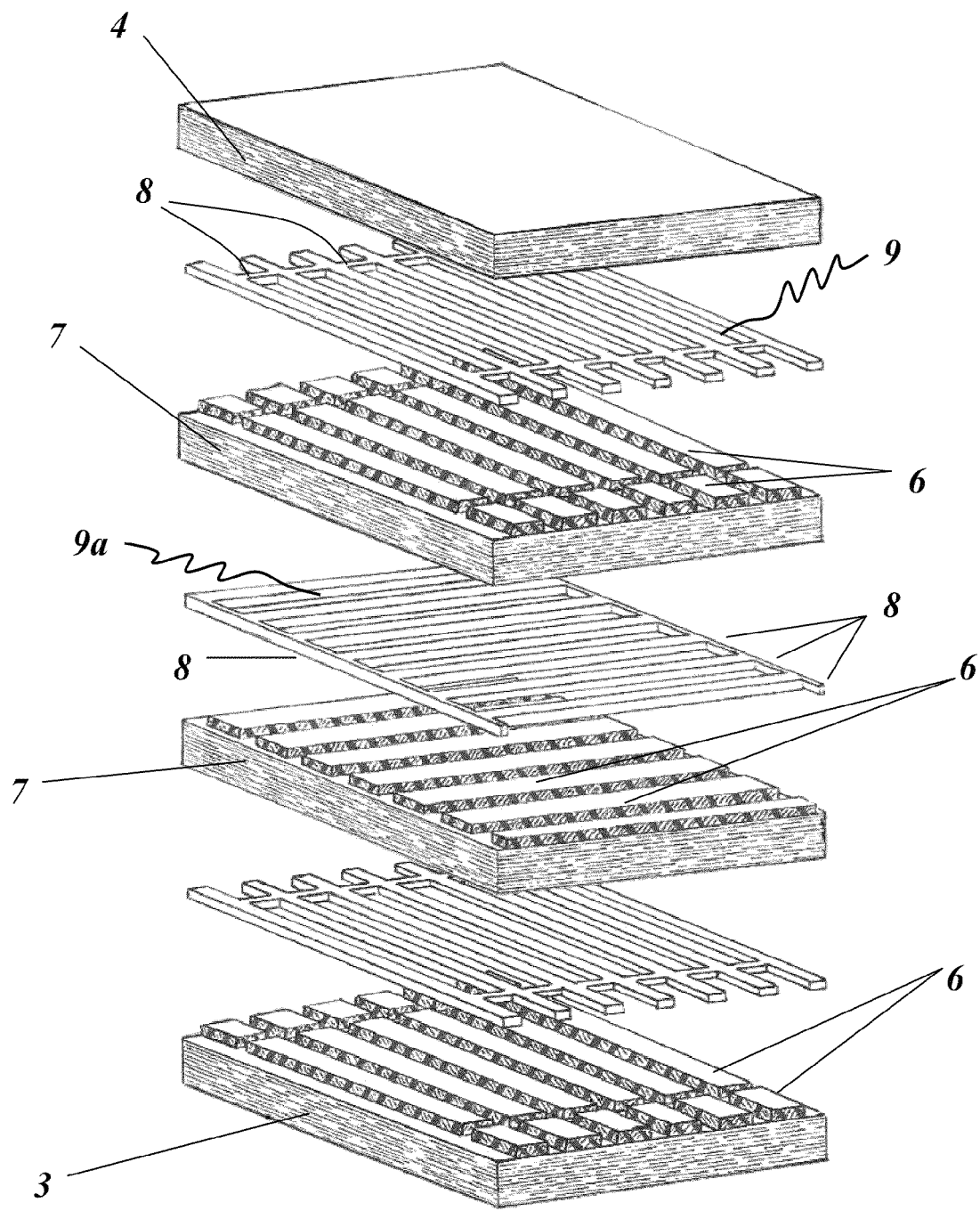
FIG. 4: is an illustration of the layers of an exemplary composite material or of a plate for an airplane wing spar expanded in the Z axis, in accordance with some embodiments of the present invention.
Figure 10:
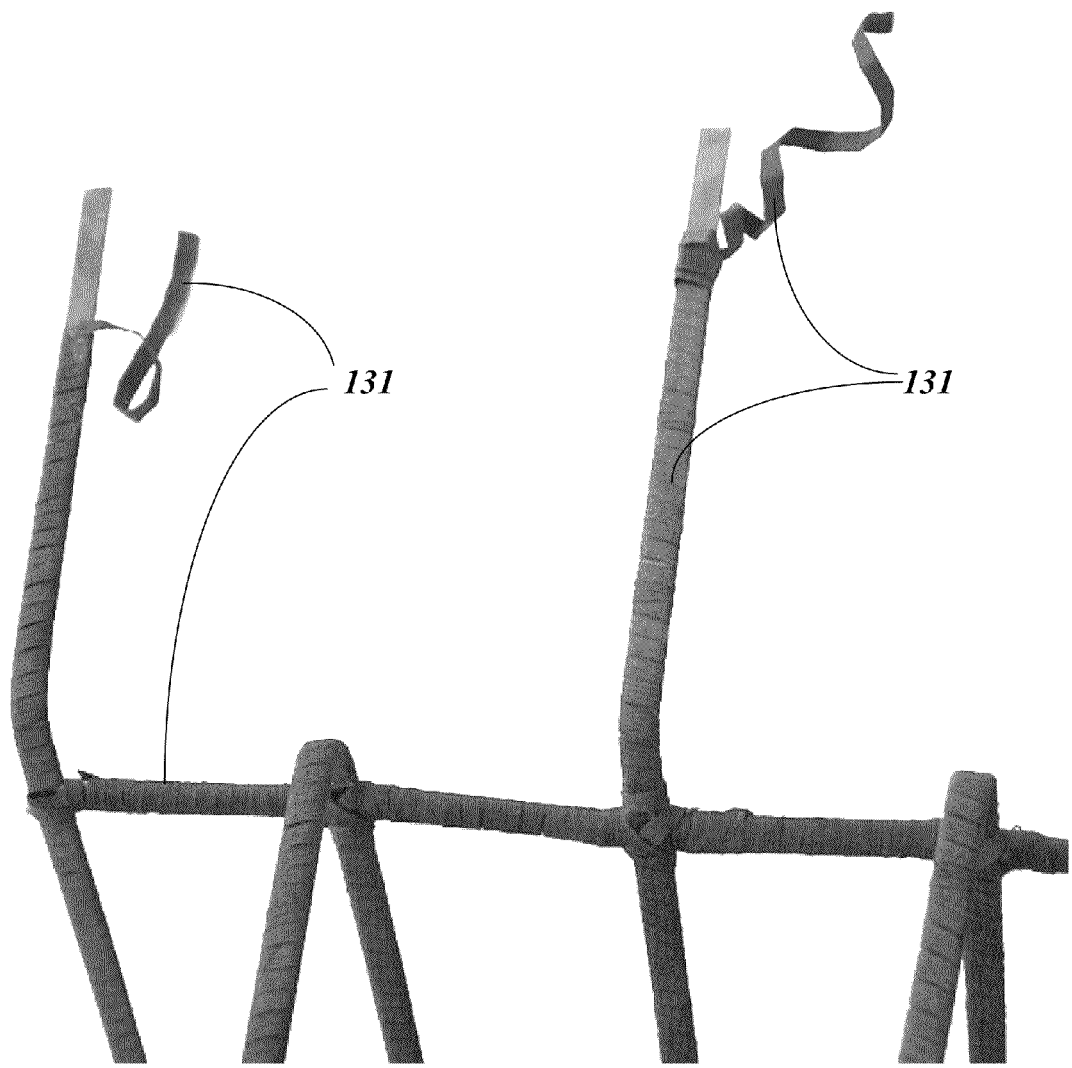
FIGS. 10+11+11A: are illustrations of exemplary metallic bodies surrounded by a non-metallic material and exemplary methods of surrounding a metallic body with a non-metallic material, all in accordance with some embodiments of the present invention.
Figure 11:
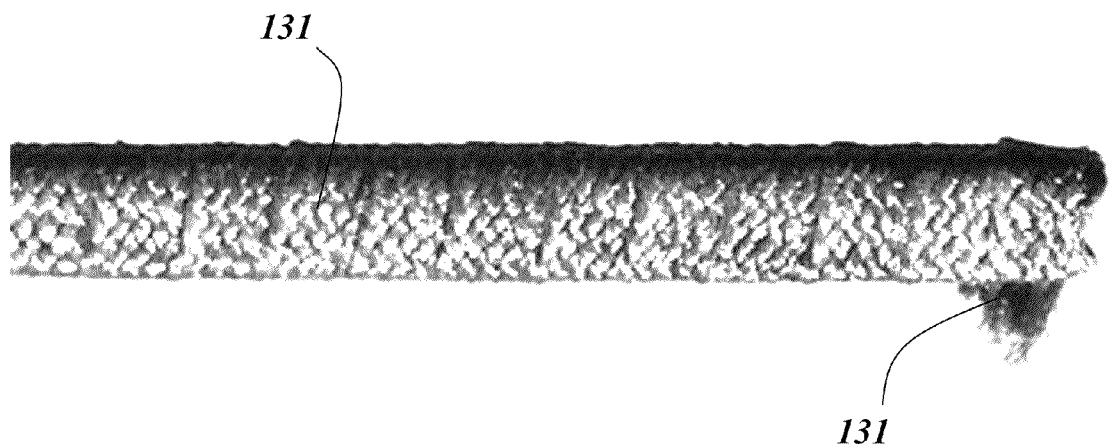
Figure 11A:
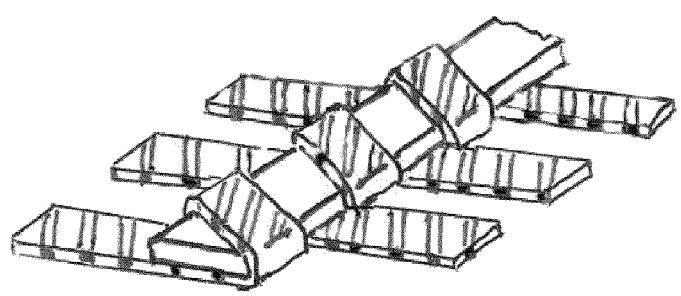
Figure 12:
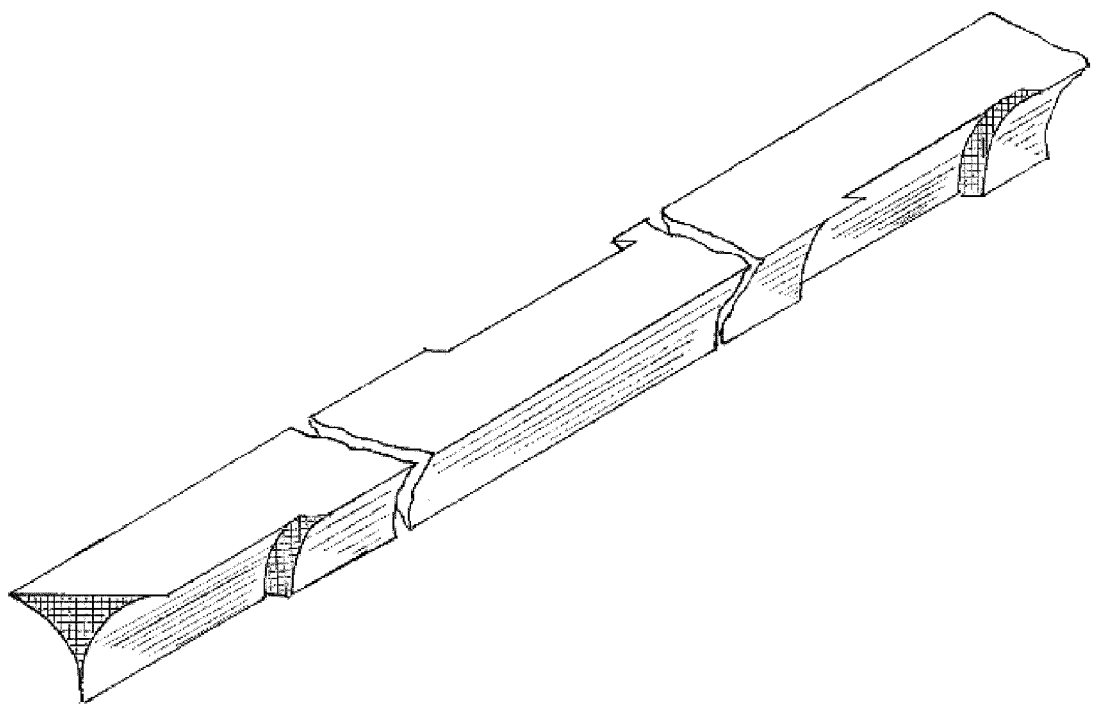
FIG. 12: is an illustration of an exemplary filler wedge, in accordance with some embodiments of the present invention.
Figure 13:
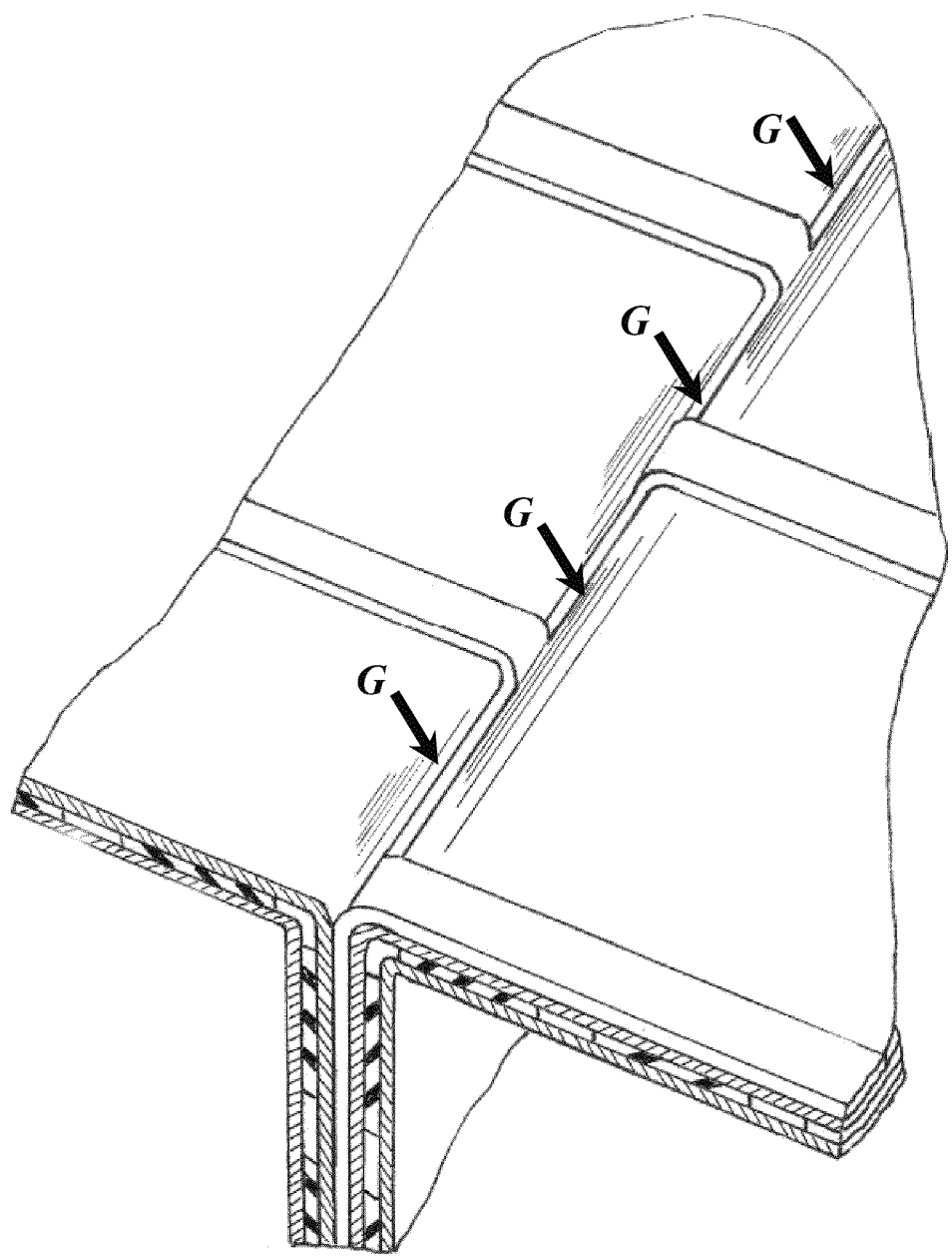
FIG. 13: is an illustration of an exemplary location (marked G) for a filler wedge, in accordance with some embodiments of the present invention.

According to some embodiments of the present invention, there may be provided a first metallic layer [9] composed of an array of metallic bodies [5] (e.g. metallic bars, strips), arranged substantially in parallel with one another [5]. The array of metallic bodies may be interconnected by one or more metallic interconnect structures, such as individual auxiliary horizontal or vertical metallic connectors [8] and/or by any other suitable means. According to some embodiments of the present invention, the metallic bodies within the first metallic layer may be constructed from any metal having a tensile strength of approximately 1140 MPA or greater, such as alloy steels, titanium alloys or stainless steel. According to some embodiments of the present invention, the metallic bodies may be straight and elongated in shape [as shown in FIGS. 1+4] and may be spaced at a distance from one another. Optionally, the spacing distance may be equal to or greater than a width of one of the metallic bodies. According to further embodiments of the present invention, some or all of the metallic bodies within the array may be individually surrounded by a non-metallic material, such as a polymer fabric [as shown in FIGS. 10+11+11A], e.g. wrapped, by a strip of non-metallic material [131], such as a polymer tape. The edges of wrapped metallic bodies may be shaped to facilitate the wrapping, e.g. have wavy or jagged edges. According to yet further embodiments of the present invention, spacing in between the metallic bodies within the array may be filled with a filler material [6], for example, a polymer fabric, a polymer fabric tape and/or any functionally similar material known today or to be devised in the future [as shown in FIGS. 4+14].

According to further embodiments of the present invention, there may be provided a second metallic layer [9a], possibly of the same dimensions as the first metallic layer [9] and composed of an array of metallic bodies [5a], wherein the metallic bodies of the second layer may be arranged substantially in parallel with one another but in a non-parallel orientation relative to the metallic bodies of the first layer [5], for example in perpendicular. The array of metallic bodies within the second metallic layer may be interconnected by one or more metallic interconnect structures, such as individual auxiliary horizontal or vertical metallic connectors [8] and/or by any other suitable means. According to some embodiments of the present invention, the metallic bodies within the second metallic layer may be constructed from any metal having a tensile strength of approximately 1140 MPA or greater, such as alloy steels, titanium alloys or stainless steel. According to some embodiments of the present invention, the metallic bodies may be straight and elongated in shape [as shown in FIGS. 1+4] and may be spaced at a distance from one another. Optionally, the spacing distance may be equal to or greater than a width of one of the metallic bodies. According to some embodiments of the present invention, the spacing of the metallic bodies in the second metallic layer may be different or substantially equal to the spacing of the metallic bodies in the first metallic layer. According to further embodiments of the present invention, some or all of the metallic bodies within the array may be individually surrounded by a non-metallic material, such as a polymer fabric [as shown in FIGS. 10+11+11A], e.g. wrapped, by a strip of non-metallic material [131], such as a polymer tape. The edges of wrapped metallic bodies may be shaped to facilitate the wrapping, e.g. have wavy or jagged edges. According to further embodiments of the present invention, spacing in between metallic bodies within the array may be filled with a filler material [6], for example, a polymer fabric sheet, a polymer fabric tape and/or any functionally similar material known today or to be devised in the future [as shown in FIGS. 4+14]. The metallic bodies of the second metallic layer [9a] may be arranged in an orientation structurally complementing to the orientation of metallic bodies in the first metallic layer [9], for example the metallic bodies of the first metallic layer [5] may be perpendicular relative to the metallic bodies of the second metallic layer [5a].

According to some embodiments of the present invention, an adjoining non-metallic layer [7] may be provided composed of one or more plies of a non-metallic material, such as a polymer fabric, e.g. carbon fiber, glass fiber, graphite fiber, aramid (Kevlar), etc. According to further embodiments of the present invention, plies of non-metallic material within the adjoining non-metallic layer may be arranged in an orientation structurally complementing an orientation of other plies of non-metallic material within the adjoining non-metallic layer, for example in a substantially perpendicular orientation. The adjoining non-metallic layer [7] may be situated between the first and second metallic layers [9+9a] and, optionally, may be of the same dimensions as the metallic layers so that the entire space between the metallic layers is filled by the non-metallic layer [as shown in FIG. 4].

According to further embodiments of the present invention, one or more series of layers substantially identical to the series of layers including the first and second metallic layers and the adjoining non-metallic layer in between may be provided. The one or more series of layers may be situated one atop the other, wherein between each series of layers there is situated a non-metallic layer substantially identical or of similar properties to the adjoining non-metallic layer. Thus, according to some embodiments of the present invention, there may be provided a series of alternating layers—metallic and non-metallic, wherein each metallic layer is separated from the next by a non-metallic layer and is composed of metallic bodies arranged in an orientation structurally complementing to the orientation of metallic bodies in the adjacent metallic layers, for example the metallic bodies within each metallic layer may be perpendicular relative to the metallic bodies within the adjacent metallic layers.

According to further embodiments of the present invention, some of the metallic layers within the series may be comprised of metallic bodies of different widths/heights/lengths than metallic bodies comprising other metallic layers in the series. Accordingly, some of the metallic layers within the series may be of different widths/heights/lengths than other metallic layers in the series.

According to yet further embodiments of the present invention, further non-metallic layers [3+4] substantially identical or of similar properties to the adjoining non-metallic layer may be situated on the top surface of the top metallic layer in the series, the bottom surface of the bottom metallic layer of the series and/or both. The further non-metallic layers may, optionally, be of the same dimensions as the other layers so that the entire topside of the series, bottomside of the series and/or both are covered by non-metallic layers [as shown in FIGS. 1+4].

According to some embodiments of the present invention, the layers may be affixed to one another by resin transfer molding (hereby "RTM"), by vacuum assisted resin transfer molding (hereby "VARTM") and/or by any other affixation technique and/or interconnection structure known today or to be devised in the future. According to further embodiments of the present invention, prior to and in preparation for the final affixation of all of the layers, some of the layers may be affixed/attached/connected to one another to form preforms, by pressure, by heating, by pressure and heating, by stitching, by staples, by an adhesive material (which may be pre-impregnated into the non-metallic layers), by an interconnecting structure, for example, with one or more cross-layer structures passing through the layer, by Z-pinning, and/or by any other affixation/attachment/connection technique and/or interconnection structure known today or to be devised in the future. Once all the layers are affixed, the series of layers may compose a composite material of multiple layers of dissimilar material, in accordance with some embodiments of the present invention.

According to further embodiments of the present invention, the layers comprising the composite material may be pre-fabricated with adaptations designed to allow connection of a structure, fabricated from the composite material, to exterior components and/or other structures, such as holes, knobs, slots, etc.

According to yet further embodiments of the present invention, the metallic bodies in some of the metallic layers may be arranged and connected such that they may also serve to conduct electric current, signals and/or digital data from one point to another according to a pre-planned electrical distribution scheme. Thus, a structure constructed from the composite material described may be fabricated to contain, in effect, an implanted circuit utilizing the metallic bodies within the material.

It should be understood that metallic bodies within the entire material are not necessarily uniform, i.e. that metallic bodies within different layers of the material may differ from each other in dimensions and composition. Accordingly different metallic layers within the material may differ from each other in dimensions and composition. For example, some metallic layers may be comprised of thinner metallic bodies (i.e. having a smaller height) than other metallic layers, making these layers thinner than others. Some metallic layers may be denser than others, by having wider or a larger number of metallic bodies, and so on. Clearly, by variating the composition of different metallic layers within the material, different properties may be achieved in the composite material produced.

According to yet further embodiments of the present invention, metallic bodies within each metallic layer of the composite material may not be uniform in shape, e.g. may be tapered to one side. Accordingly, some metallic layers in some further embodiments of the present invention may not be uniform in shape, e.g. may be thinner on one side. As a result, in such embodiments, composite materials having different shapes may be produced. For example, a composite material comprised of one or more metallic layers which are thinner on one side may have a conic shape.

Exemplary Embodiments

The following is a description of some specific exemplary implementations of the present invention. These following specific exemplary embodiments of the present invention are presented to further clarify the present invention and the possible implementations of its principles, and as such, should not be understood to encompass the full scope of the present invention in any way. It should be clear to anyone of ordinary skill in the art that many other implementations of the present invention are possible.

Figure 2:
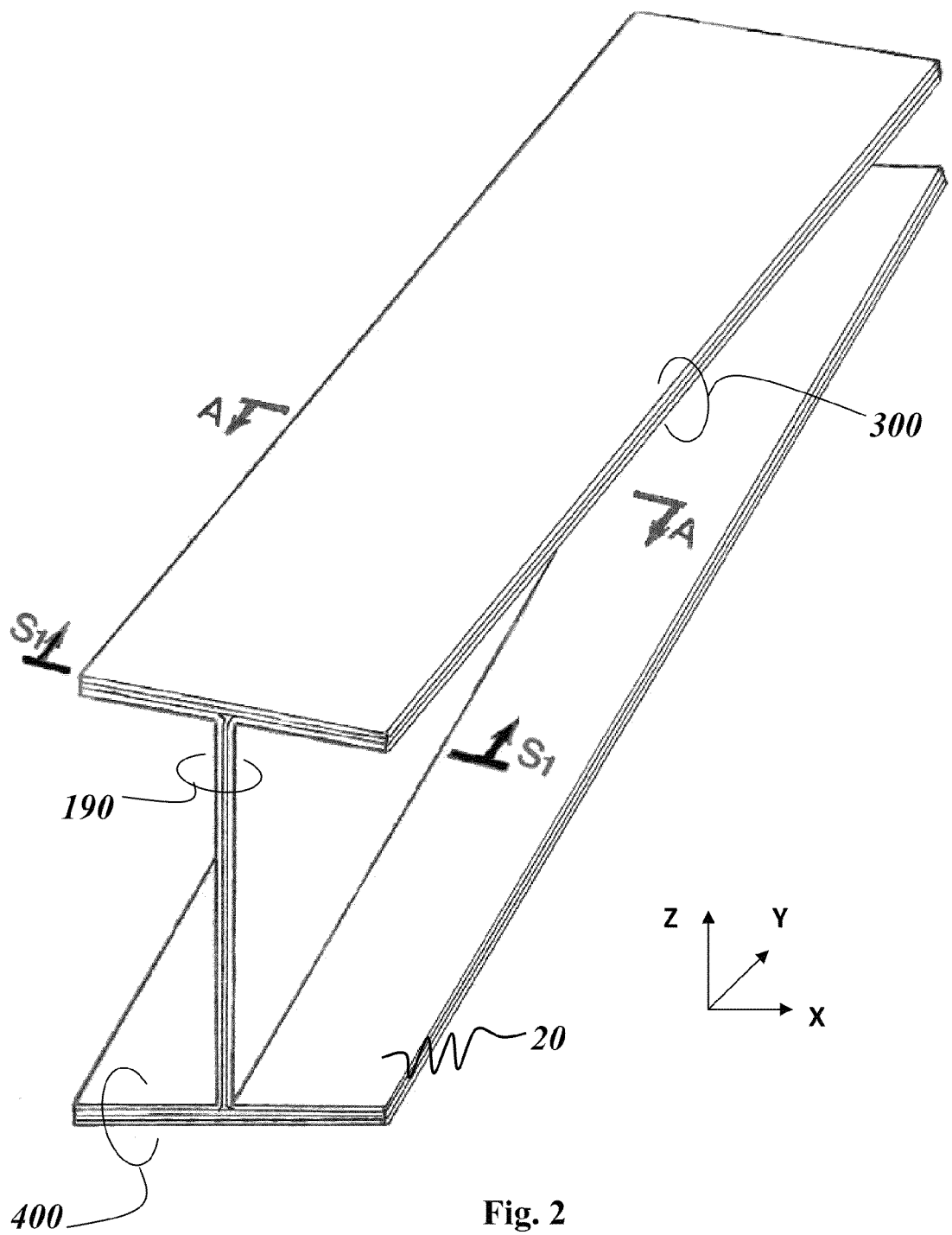
FIG. 2: is an illustration of an exemplary airplane wing spar having a 10 meter length, in accordance with some embodiments of the present invention.
Figure 3:
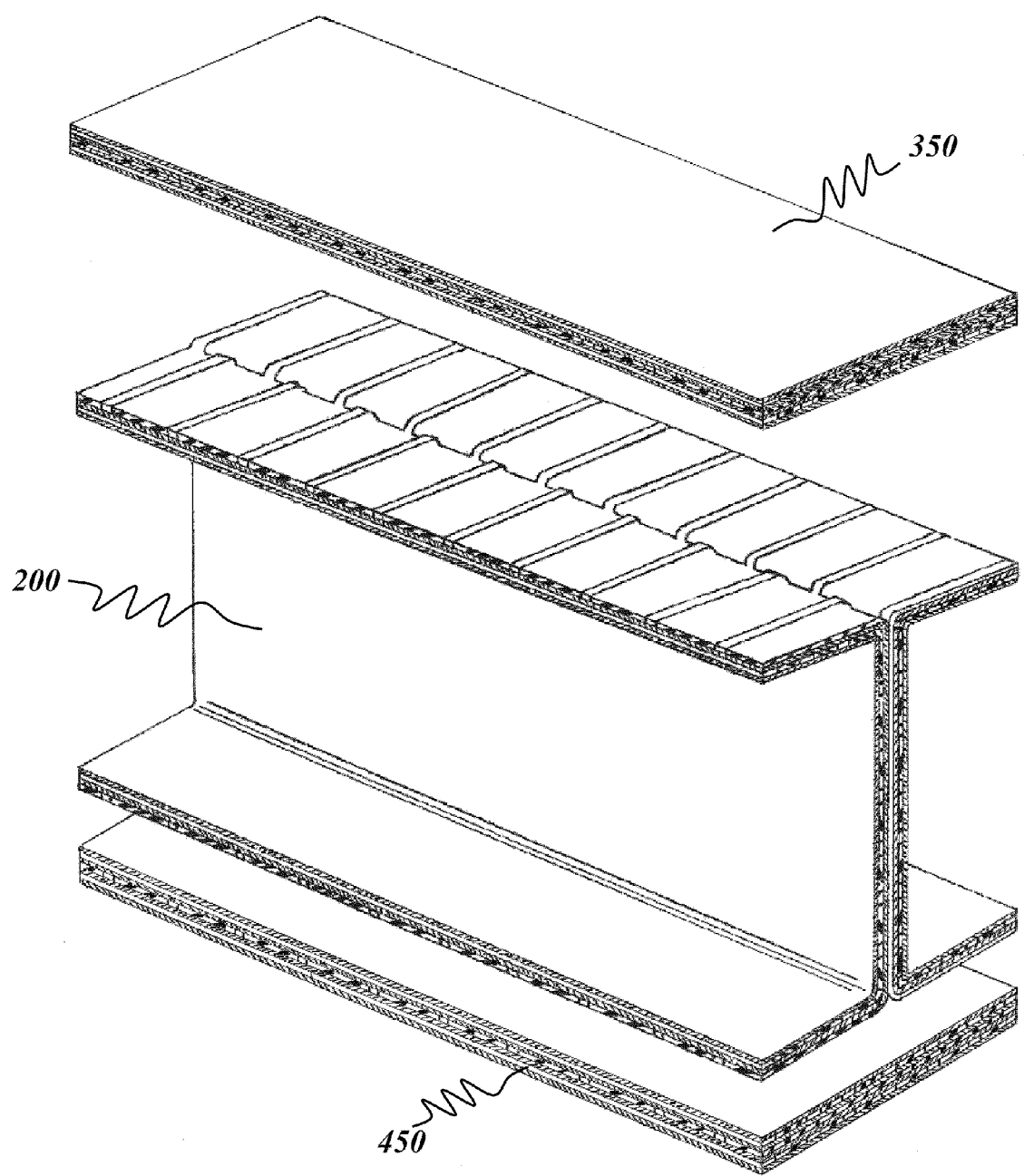
FIG. 3: is an illustration of the 1.5 meter portion of the exemplary airplane wing spar shown in FIG. 2 located between A-A and S1-S1 and expanded in the Z axis, wherein the top and bottom plates are shown separated from the Base Frame+Flanks, all in accordance with some embodiments of the present invention.

According to some embodiments of the present invention, a structural element (such as an aircraft wing spar [as shown in FIG. 2] deck floor, fuselage part, bally, bulkhead, etc., a helicopter rotor blade a boat or vehicle part, or any other structural element) comprised of a composite material, and a method for producing the same may be provided. The structural element may be comprised of multiple metallic layers, each being comprised of an array of metallic bodies, wherein the metallic layers may be separated by non-metallic layers, each comprised of one or more plies of non-metallic material, such as polymer fabric. According to further embodiments of the present invention, metallic bodies in some metallic layers may be arranged in an orientation structurally complementing an orientation of metallic bodies in other metallic layers, for example in a substantially perpendicular orientation.

Reference is now made to FIGS. 1-14, which show elements that may comprise an aircraft wing spar comprised of a composite material, according to some embodiments of the present invention, and their arrangement:

Base Frame

Figure 9:
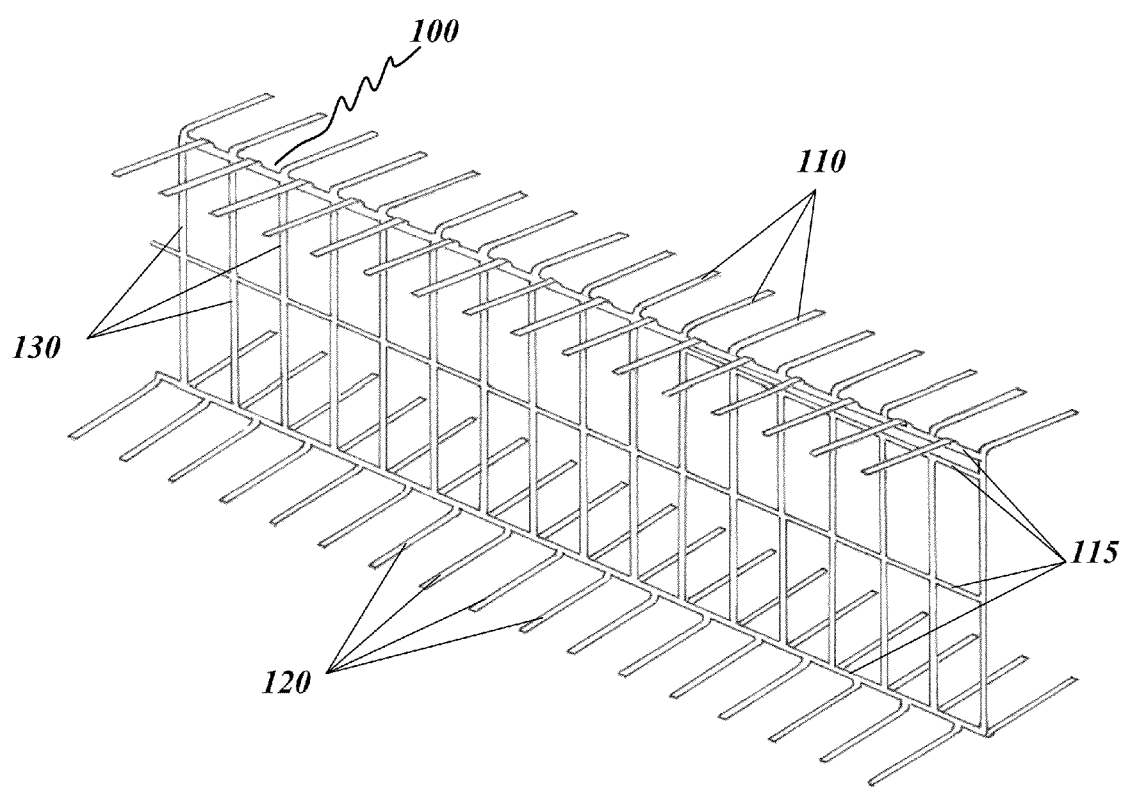
FIG. 9: is an illustration an exemplary Base Frame, in accordance with some embodiments of the present invention.

According to some embodiments of the present invention, a pre-formed metallic frame, comprised of an array of metallic oblong bars may be provided [shown in FIG. 9 and marked 100 in other figs] (metallic bars=a form of metallic bodies, according to some embodiments of the present invention). The metallic bars may be constructed from any metal having a tensile strength of approximately 1140 MPa or greater, such as alloy steels, titanium alloys or stainless Steel. According to further embodiments of the present invention, metal may be arranged in the frame form prior to being hardened to create a pre-formed metallic frame.

According to some embodiments of the present invention, the metallic frame [100] may be of a shape resembling an "I" beam and may be comprised of metallic bars arranged vertically, possibly in parallel, with outward bending bars on the top [110] and bottom [120], wherein each adjacent outward bending bar may bend in a 180° direction to the next [as shown in FIG. 9], to form an elongated spar frame structure having an "I" shaped cross section. The vertical bars may be interconnected by horizontal bars [115] of similar composition to the vertical bars, which horizontal bars may run along the length of the frame structure [as shown in FIG. 9]. According to some embodiments of the present invention, spacing in between metallic bars within the array may be filled with a filler material [6], for example, a polymer fabric sheet, a polymer fabric tape and/or any functionally similar material known today or to be devised in the future [as shown in FIGS. 4+14]. According to further embodiments of the present invention, some or all of the bars within the Base Frame, vertical and/or horizontal, may be individually surrounded by a non-metallic material, such as a polymer fabric [as shown in FIGS. 10+11+11A], e.g. wrapped, by a strip of non-metallic material [131], such as a polymer tape. The edges of wrapped bars may be shaped to facilitate the wrapping, e.g. have wavy or jagged edges. According to further embodiments of the present invention, the metallic frame may be higher on one end than the other [as shown in FIGS. 2A, 2B+2C (Details D+E)], such that the plane of one surface of the frame is diagonal in the longitudinal direction, in comparison to the other [shown in FIGS. 2+2A], for example the plane of the top surface of the frame may be sloping at a 2° angle in the longitudinal direction in relation to the plane of the bottom surface. Furthermore, the metallic frame may be higher on one side than the other, such that the plane of one surface of the frame is diagonal in the cross sectional direction, in comparison to the other [shown in FIG. 5], for example the plane of the top surface of the frame may be sloping at a 10° angle in the transverse cross sectional direction in relation to the plane of the bottom surface.

Side Flanks

Figure 6:
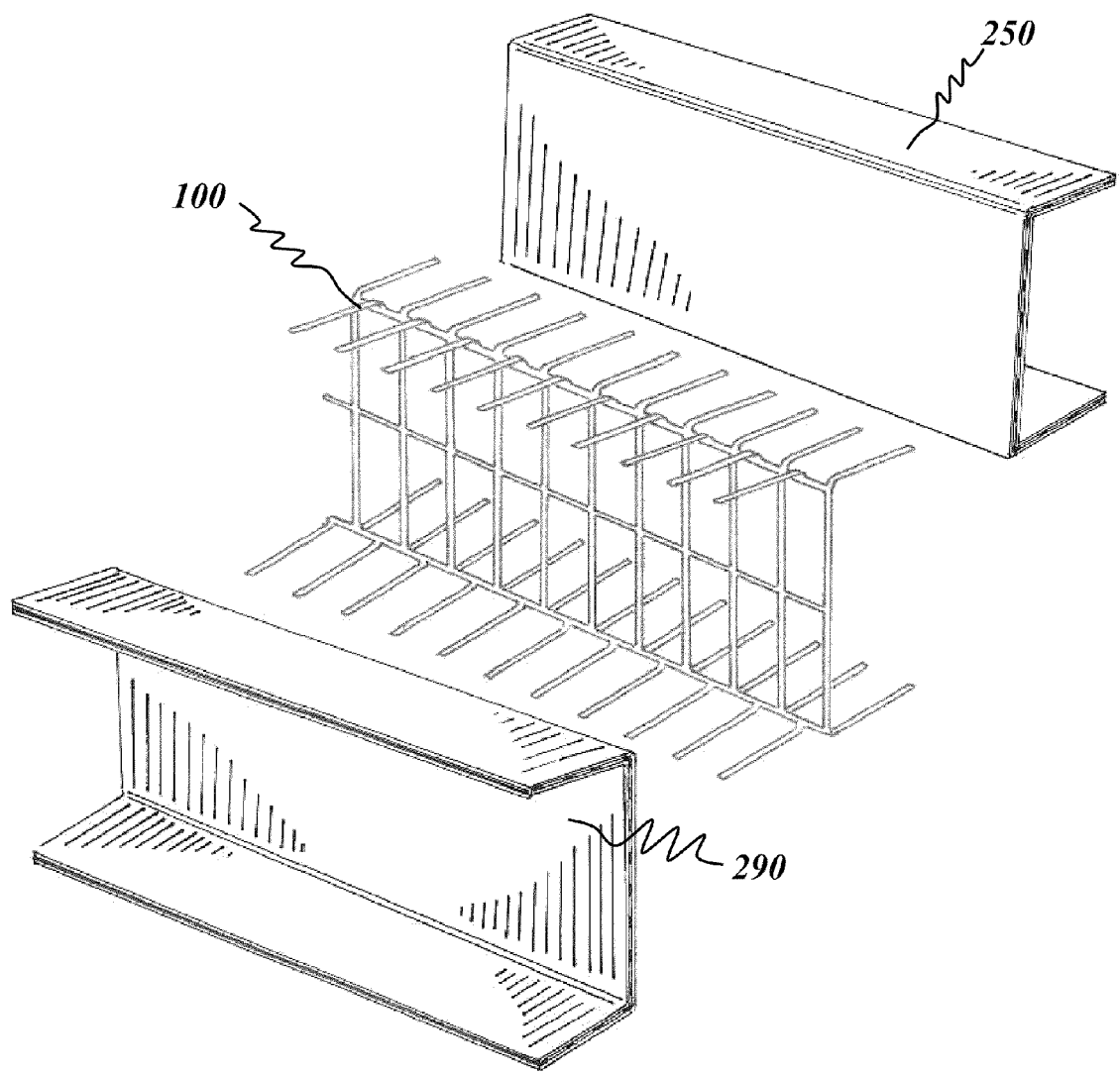
FIG. 6: is an illustration of an exemplary Base Frame and Side Flanks of an airplane wing spar, in accordance with some embodiments of the present invention.
Figure 7:
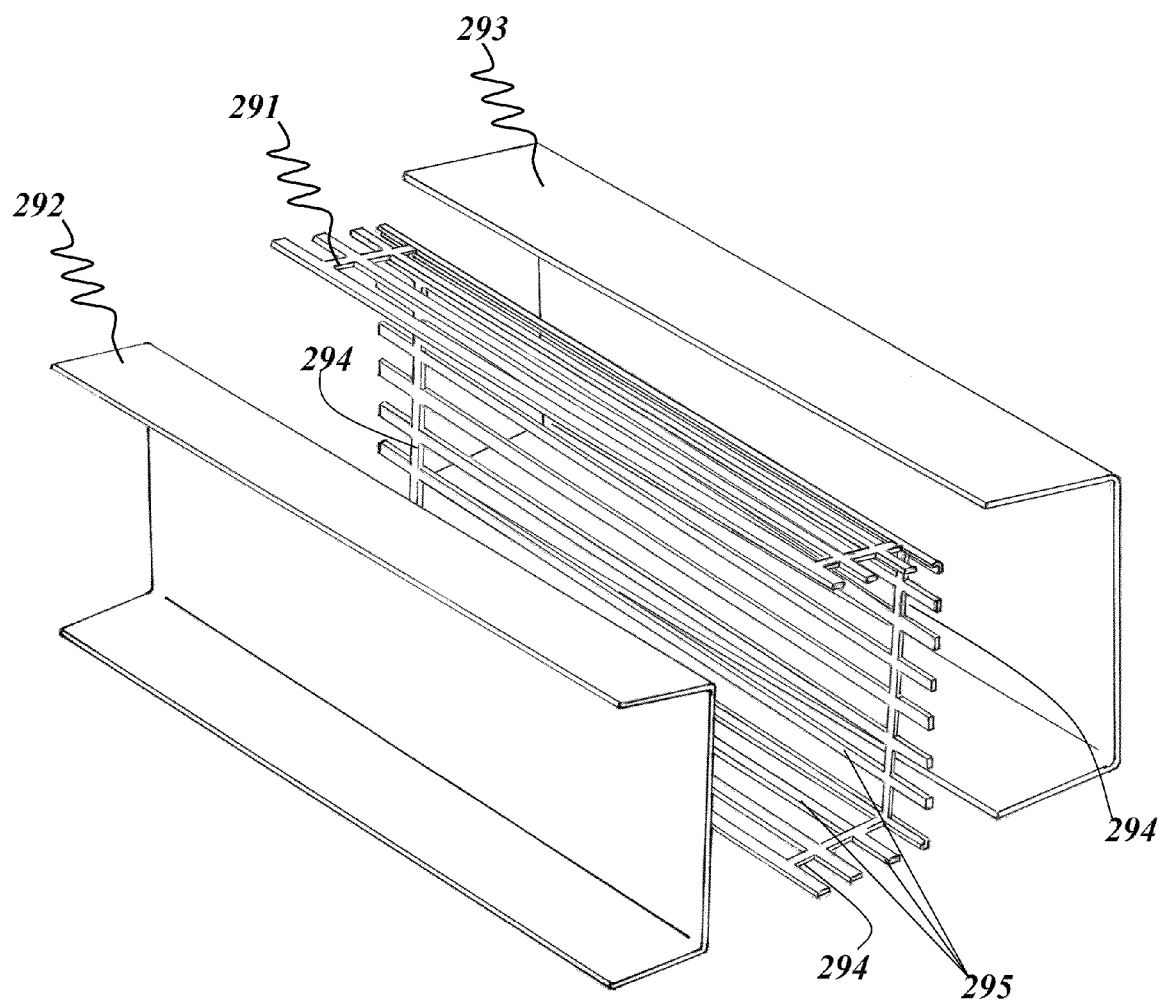
FIG. 7: is an illustration of the layers of an exemplary left Flank, in accordance with some embodiments of the present invention.

Reference is now made to FIGS. 6+7. According to some embodiments of the present invention, a left pre-formed elongated beam shaped structure with a "U" shaped cross section [290] may be provided (the Left Flank). Said structure may be comprised of multiple layers of alternating metallic and non-metallic layers [as shown in FIG. 7] and may be fabricated with a sloping top flange (open wide tendency), so as to fit snugly within the left side (the open wide side) of the Base Frame described above [as shown in FIGS. 2A, 6+7]. According to some embodiments of the present invention, a first metallic layer of the beam structure [291] may be constructed of an array of first oblong metallic bars [295], arranged to structurally complement the metallic bars of the Base Frame [130], such as substantially in parallel along the length of the structure, and interconnected by second metallic bars [294] arranged substantially in parallel to each other and substantially perpendicular to the first metallic bars [as shown in FIG. 7]. The second metallic bars may be bent at the ends to form the "U" shape of the cross section of the left beam shaped structure, as shown in FIG. 7. All the metallic bars, horizontal and vertical, may be constructed from any metal having a tensile strength of approximately 1140 MPa or greater, such as alloy steels, titanium alloys or Stainless Steel. According to further embodiments of the present invention, metal may be arranged in the end form prior to being hardened. According to some embodiments of the present invention, spacing in between metallic bars within the array [294+295] may be filled with a filler material [6], for example, a polymer fabric sheet, a polymer fabric tape and/or any functionally similar material known today or to be devised in the future [as shown in FIGS. 4+14]. According to further embodiments of the present invention, some or all of the bars within the Base Frame, vertical and/or horizontal, may be individually surrounded by a non-metallic material, such as a polymer fabric [as shown in FIGS. 10+11+11A], e.g. wrapped, by a strip of non-metallic material [131], such as a polymer tape. The edges of wrapped bars may be shaped to facilitate the wrapping, e.g. have wavy or jagged edges. According to some embodiments of the present invention, the first metallic layer [291] may be covered on both sides by non-metallic layers [292+293] each being composed of one or more plies of a non-metallic material, such as a polymer fabric, e.g. carbon fiber, glass fiber, graphite fiber, aramid (Kevlar), etc. According to further embodiments of the present invention, plies of non-metallic material within the non-metallic layer may be arranged in an orientation structurally complementing an orientation of other plies of non-metallic material within the same non-metallic layer, for example in a substantially perpendicular orientation. The metallic and non-metallic layers may be affixed to one another by pressing the entire series of layers together, by stitching, by staples, by an adhesive material (which may be pre-impregnated into the non-metallic layers), by heating, by an interconnecting structure, for example, with one or more cross-layer structures passing through the layer, by Z-pinning and/or with any other interconnection structure or technique known today or to be devised in the future. Once attached the series of layers described may form the left pre-formed beam shaped structure [290]. According to some embodiments of the present invention, the planes of the left beam shaped structure may be fabricated to correspond to the respective angles of the left side of the Base Frame [100], which it is intended to correspond to.

Reference is now made to FIGS. 6+8. According to some embodiments of the present invention, a right pre-formed elongated beam shaped structure with a "U" shaped cross section [250] may be provided (the Right Flank). The right beam shaped structure may be substantially identical in composition and arrangement to the left Flank and may substantially mirror in shape the left Flank with the difference being that it may correspond, in shape, to the opposing side (right side) of the Base Frame [100].

Figure 8:
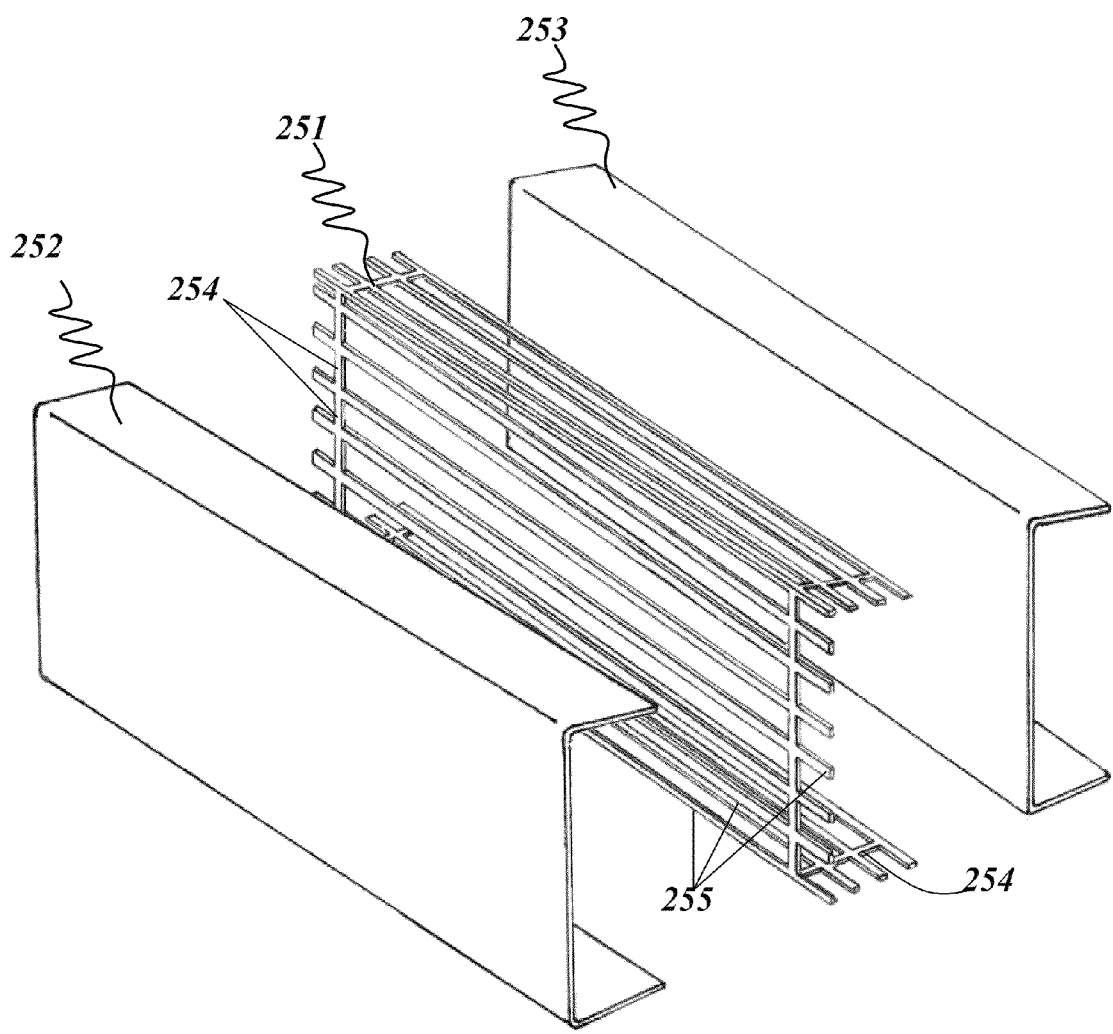
FIG. 8: is an illustration of the layers of an exemplary right Flank, in accordance with some embodiments of the present invention.

The right flank structure may be comprised of multiple layers of alternating metallic and non-metallic layers [as shown in FIG. 8] and may be fabricated with a sloping top flange (closed narrow tendency), so as to fit snugly within the right side (the closed narrow side) of the Base Frame described above [as shown in FIGS. 2A, 6+8]. According to some embodiments of the present invention, a first metallic layer of the right beam structure [251] may be constructed of an array of first oblong metallic bars [255], arranged to structurally complement the metallic bars of the Base Frame [130], such as substantially in parallel along the length of the structure, and interconnected by second metallic bars [254] arranged substantially in parallel to each other and substantially perpendicular to the first metallic bars [as shown in FIG. 8]. The second metallic bars may be bent at the ends to form the "U" shape of the cross section of the left beam shaped structure, as shown in FIG. 8. All the metallic bars, horizontal and vertical, may be constructed from any metal having a tensile strength of approximately 1140 MPa or greater, such as alloy steels, titanium alloys or Stainless Steel. According to further embodiments of the present invention, metal may be arranged in the end form prior to being hardened. According to some embodiments of the present invention, spacing in between metallic bars within the array [254+255] may be filled with a filler material [6], for example, a polymer fabric sheet, a polymer fabric tape and/or any functionally similar material known today or to be devised in the future [as shown in FIGS. 4+14]. According to further embodiments of the present invention, some or all of the bars within the Base Frame, vertical and/or horizontal, may be individually surrounded by a non-metallic material, such as a polymer fabric [as shown in FIGS. 10+11+11A], e.g. wrapped, by a strip of non-metallic material [131], such as a polymer tape. The edges of wrapped bars may be shaped to facilitate the wrapping, e.g. have wavy or jagged edges. According to some embodiments of the present invention, the first metallic layer [251] may be covered on both sides by non-metallic layers [252+253] each being composed of one or more plies of a non-metallic material, such as a polymer fabric, e.g. carbon fiber, glass fiber, graphite fiber, aramid (Kevlar), etc. According to further embodiments of the present invention, plies of non-metallic material within the non-metallic layer may be arranged in an orientation structurally complementing an orientation of other plies of non-metallic material within the same non-metallic layer, for example in a substantially perpendicular orientation. The metallic and non-metallic layers may be affixed to one another by pressing the entire series of layers together, by stitching, by staples, by an adhesive material (which may be pre-impregnated into the non-metallic layers), by heating, by an interconnecting structure, for example, with one or more cross-layer structures passing through the layer, by Z-pinning and/or with any other interconnection structure or technique known today or to be devised in the future. Once attached the series of layers described may form the right pre-formed beam shaped structure—Right Flank [290]. According to some embodiments of the present invention, the planes of the Right Flank may be fabricated to correspond to the respective angles of the right side of the Base Frame [100], which it is intended to correspond to.

Filler Wedges

Figure 5:
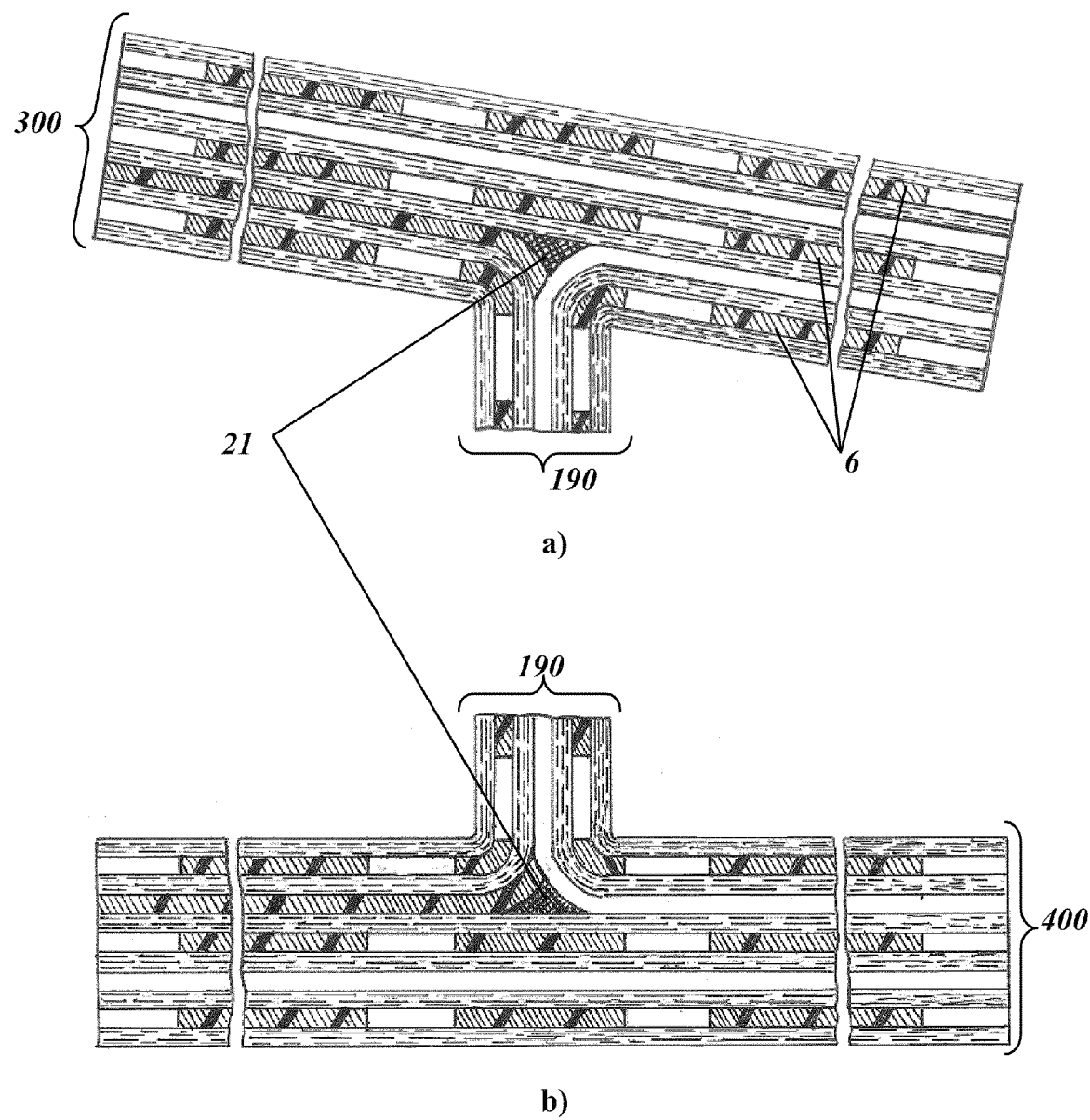
FIG. 5: is an illustration of the S1-S1 cross section of the exemplary airplane wing spar shown in FIG. 2, showing the junction between an exemplary web and exemplary top and bottom Plates with exemplary filler wedges inserted, all in accordance with some embodiments of the present invention.
Figure 14:
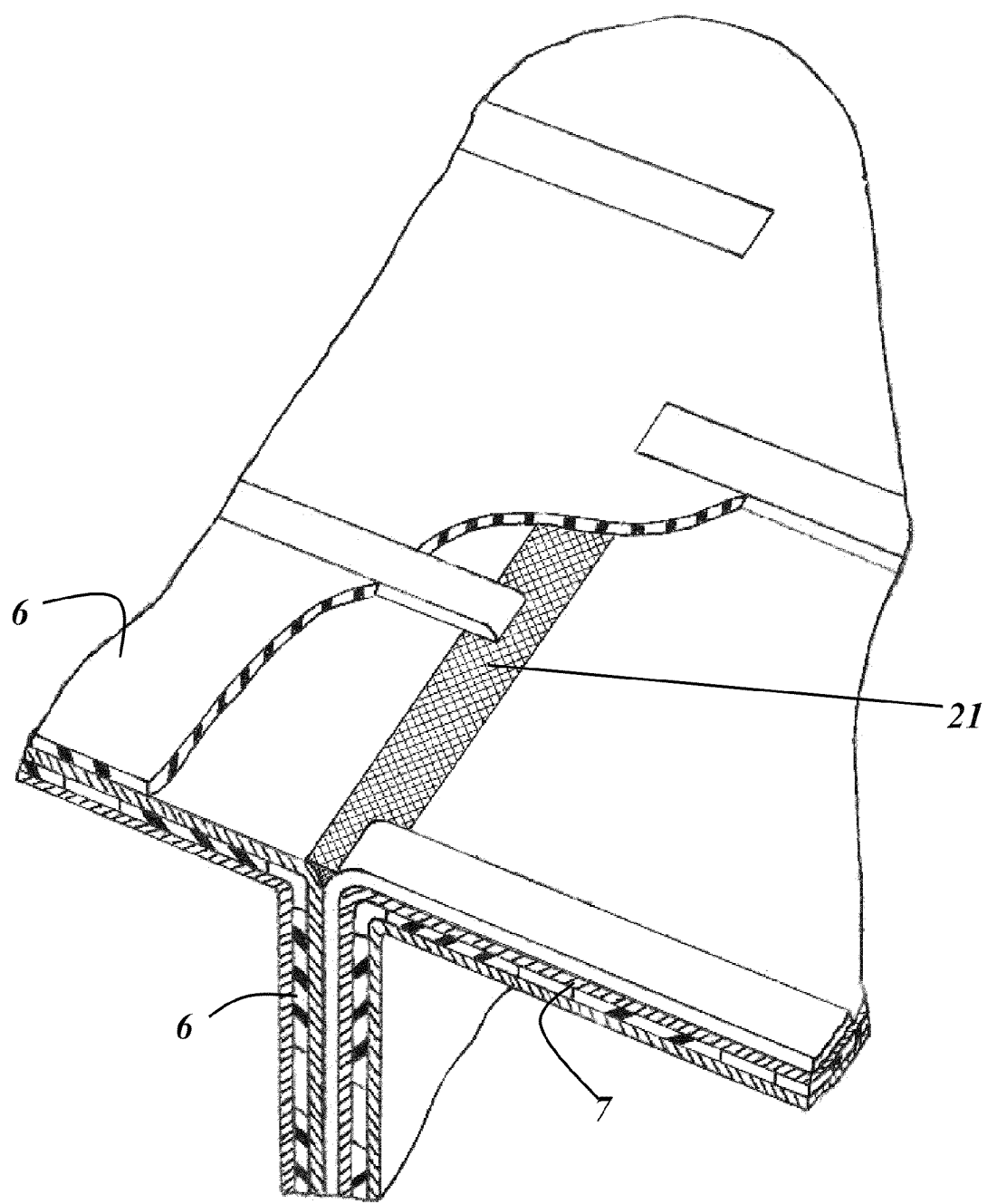
FIG. 14: is an illustration an exemplary Base Frame+Side Flanks including a filler wedge, in accordance with some embodiments of the present invention.

Reference is now made to FIGS. 5+12-14. According to some embodiments of the present invention, wedge shaped structures [21] may be provided [FIG. 12]. The wedge shaped structures may be fabricated of a preformed cast of polymer strings or fibers, or a similar substance, may be pre-impregnated with an adhesive material, such as an epoxy resin and may be shaped to fit into the space existing on the center of the top and bottom of the Base Frame [as shown in FIG. 14], where the metallic bodies of the base frame bend outwards [shown by G in FIG. 13]. According to further embodiments of the present invention the wedge shaped structures may include precast slots to allow for the space taken up by the metallic bodies themselves [23], allowing the wedge shaped structures to be fit snugly into the designated space such as to create a flat surface on the top or bottom of the "I" shaped frame.

Top and Bottom Plates

According to some embodiments of the present invention, pre-formed elongated plates [350+450] matching the dimensions of the top and bottom surfaces of the Base Frame may be provided. The plates may be comprised of multiple layers of metallic and non-metallic layers arranged to structurally complement each other. Reference is now made to FIG. 4, which shows the composition and arrangement of the layers comprising the plates, according to some embodiments of the present invention.

According to some embodiments of the present invention, there may be provided a first metallic layer of a plate, which may correspond to the top surface of the Base Frame in dimensions and may be composed of an array of metallic bodies [5], e.g. bars, arranged substantially in parallel with one another [as shown in FIG. 4]. The array of metallic bodies may be interconnected by one or more metallic interconnect structures, such as individual auxiliary horizontal or vertical metallic connectors [8] and/or by any other suitable means. According to some embodiments of the present invention, the metallic bodies within the first metallic layer may be constructed from any metal having a tensile strength of approximately 1140 MPA or greater, such as alloy steels, titanium alloys or stainless steel. According to further embodiments of the present invention, metal may be arranged in the end form prior to being hardened. According to some embodiments of the present invention, the metallic bodies may be straight and elongated in shape [as shown in FIGS. 4+6] and may be spaced at a distance from one another. According to further embodiments of the present invention, some or all of the metallic bodies within the array may be individually surrounded by a non-metallic material, such as a polymer fabric [as shown in FIGS. 10+11+11A], e.g. wrapped, by a strip of non-metallic material [131], such as a polymer tape. The edges of wrapped metallic bodies may be shaped to facilitate the wrapping, e.g. have wavy or jagged edges. According to yet further embodiments of the present invention, spacing in between the metallic bodies within the array may be filled with a filler material [6], for example, a polymer fabric, a polymer fabric tape and/or any functionally similar material known today or to be devised in the future.

According to further embodiments of the present invention, there may be provided a second metallic layer [9a], possibly of the same dimensions as the first metallic layer [9] and composed of an array of metallic bodies, wherein the metallic bodies of the second layer [5a] may be arranged substantially in parallel with one another but in an orientation structurally complementing the metallic bodies of the first layer [5], for example in perpendicular. According to some embodiments of the present invention, the metallic bodies may be straight and elongated in shape [as shown in FIGS. 4+6] and may be spaced at a distance from one another. According to further embodiments of the present invention, the spacing of the metallic bodies in the second metallic layer may be substantially equal to the spacing of the metallic bodies in the first metallic layer. The array of metallic bodies within the second metallic layer may be interconnected by one or more metallic interconnect structures, such as individual auxiliary horizontal or vertical metallic connectors [8] and/or by any other suitable means. According to further embodiments of the present invention, some or all of the metallic bodies within the array may be individually surrounded by a non-metallic material, such as a polymer fabric [as shown in FIGS. 10+11+11A], e.g. wrapped, by a strip of non-metallic material [131], such as a polymer tape. The edges of wrapped metallic bodies may be shaped to facilitate the wrapping, e.g. have wavy or jagged edges. According to further embodiments of the present invention, spacing in between metallic bodies within the array may be filled with a filler material [6], for example, a polymer fabric, a polymer fabric tape and/or any functionally similar material known today or to be devised in the future.

According to some embodiments of the present invention, a adjoining non-metallic layer may be provided composed of one or more plies of a non-metallic material, such as a polymer fabric, e.g. carbon fiber, glass fiber, graphite fiber, aramid (Kevlar), etc. According to further embodiments of the present invention, plies of non-metallic material within the adjoining non-metallic layer may be arranged in an orientation structurally complementing an orientation of other plies of non-metallic material within the adjoining non-metallic layer, for example in a substantially perpendicular orientation. The adjoining non-metallic layer may be situated between the first and second metallic layers and, optionally, may be of the same dimensions as the metallic layers so that the entire space between the metallic layers is filled by the adjoining non-metallic layer.

According to further embodiments of the present invention, one or more series of layers substantially identical to the series of layers including the first and second metallic layers and the adjoining non-metallic layer in between may be provided. The one or more series of layers may be situated one atop the other, wherein each series of layers is separated from the other by a non-metallic layer substantially identical or of similar properties to the adjoining non-metallic layer. Thus, according to some embodiments of the present invention, there may be provided a series of alternating layers—metallic and non-metallic, wherein each metallic layer is separated from the next by a non-metallic layer and is composed of metallic bodies arranged in an orientation structurally complementing to the orientation of metallic bodies in the adjacent metallic layers, for example the metallic bodies within each metallic layer may be perpendicular relative to the metallic bodies within the adjacent metallic layers.

According to further embodiments of the present invention, some of the metallic layers within the series may be comprised of metallic bodies of different widths/heights/lengths than metallic bodies comprising other metallic layers in the series. Accordingly, some of the metallic layers within the series may be of different widths/heights/lengths than other metallic layers in the series.

According to yet further embodiments of the present invention, further non-metallic layers substantially identical or of similar properties to the adjoining non-metallic layer may be situated on the top surface of the top metallic layer in the series, the bottom surface of the bottom metallic layer of the series and/or both. The further non-metallic layers may, optionally, be of the same dimensions as the other layers so that the entire topside of the series, bottomside of the series and/or both are covered by non-metallic layers.

According to some embodiments of the present invention, the layers may be affixed to one another by pressing the entire series of layers together, by stitching, by staples, by an adhesive material (which may be pre-impregnated into the non-metallic layers), by heating, by an interconnecting structure, for example, with one or more cross-layer structures passing through the layer, by Z-pinning and/or with any other interconnection structure or technique known today or to be devised in the future. Once affixed the series of layers may compose a pre-formed elongated plate [350+450] matching the dimensions of the top or bottom surfaces of the metallic frame.

It should be understood that metallic bodies within the entire structure are not necessarily uniform, i.e. that metallic bodies within different layers of each portion of the structure and in different portions of the structure may differ from each other in dimensions and composition. Accordingly different metallic layers within each portion of the structure and in different portions of the structure may differ from each other in dimensions and composition.

Method of Fabrication

According to further embodiments of the present invention, in order to construct the spar structure desired, the elements described above may be pre-fabricated separately. The pre-formed elements may then be attached wherein two side flanks [290+250] may be affixed to a base frame, on the sides of the frame to which they were designed and/or fabricated to correspond to. The Base Frame together with the side flanks may be affixed to each other first to create a perform [200]. Top and bottom plates [350+450] may then be affixed to the top and bottom of the perform [200], with the filler wedges [21], fabricated as described above, inserted and affixed within the spaces they were intended for. Said affixations may be performed by pressure, by stitching, by staples, by an adhesive material (which may be pre-impregnated into the non-metallic layers), by heating, by an interconnecting structure, for example, with one or more cross-layer structures passing through the layer, by Z-pinning and/or with any other interconnection structure or technique known today or to be devised in the future.

Once the elements are attached in the final structure, the entire structure may undergo a RTM and/or VARTM process to permanently affix the elements to each other and create a finished airplane spar structure.

According to yet further embodiments of the present invention, the structures comprising the spar may be pre-fabricated with adaptations designed to allow connection of the spar to exterior components and/or other structures, such as holes, knobs, slots, etc. Furthermore, according to yet further embodiments of the present invention, the metallic bodies within some of the metallic layers contained throughout the spar, may be arranged and connected such that they may also serve to conduct electric current, signals and/or digital data from one point to another according to a pre-planned electrical distribution scheme. Thus, the spar may be constructed to contain, in effect, an implanted circuit utilizing the metallic bodies contained within the material.

It should be understood by one of ordinary skill in the art, that the above described combination of discreet elements is one of many possible combinations of elements possible to fabricate an aircraft wing spar or any other structural element desired, in accordance with the principles of this invention.

It should also be understood by one of skill in the art that some of the functions described as being performed by a specific component of the system may be performed by a different component of the system in other embodiments of this invention.

The present invention can be practiced by employing conventional tools, methodology and components. Accordingly, the details of any such tool, component and methodology are not set forth herein in detail. In the previous descriptions, numerous specific details are set forth, in order to provide a thorough understanding of the present invention. However, it should be recognized that the present invention may be practiced without resorting to the details specifically set forth.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A composite material comprising:
    at least two metallic arrays of rigid oblong metallic bodies, wherein said metallic bodies have a tensile strength of 1140 MPa or greater, are at least 0.3 millimeters (mm.) thick, at least 2 mm wide and at least 10 mm long and spaces between the metallic bodies within each of the at least two metallic arrays are filled with a non-metallic filler;
    a separating non-metallic layer between each given two metallic arrays of the at least two metallic arrays, each of said separating non-metallic layers being comprised of polymer fabric or carbon fiber residing contiguously between the given two metallic arrays; and
    two exterior non-metallic layers comprised of polymer fabric or carbon fiber contiguously residing on an exterior side of an exterior metallic array of said at least two metallic arrays;
    wherein said at least two metallic arrays and said separating and exterior non-metallic layers are arranged in contiguous alternating layers, starting and ending with a non-metallic layer, to form a solid composite material having a non-metallic exterior surface.

2. The material according to claim 1, wherein the orientation of said metallic bodies in a first metallic array of the at least two metallic arrays is structurally complementing to the orientation of said metallic bodies in a second metallic array of the at least two metallic arrays, which second metallic array is adjacent to said first metallic array.

3. The material according to claim 2, wherein the orientation of said metallic bodies in said first metallic array is substantially perpendicular to the orientation of one or more of said metallic bodies in said second metallic array.

4. The material according to claim 1, wherein said metallic bodies have a substantially rectangular cross section, such that said metallic bodies have at least one flat surface facing an exterior surface.

5. The material according to claim 1, wherein said layers and arrays are attached to each other by an adhesive substance.

6. The material according to claim 1, wherein said metallic arrays are continuous metallic arrays.

7. The material according to claim 5, wherein at least a portion of said metallic bodies are individually wrapped by a strip of polymer fabric or carbon fiber, prior to adhesion to said non-metallic layers.

8. The material according to claim 1, wherein said metallic bodies are connected by perpendicular auxiliary metal connectors to form a continuous integral metal grid form, wherein each of said connectors protrudes from both sides of metallic bodies it connects.

9. A structural element comprised of:
    a component for providing structural integrity comprised of:
        first and second metallic arrays composed of an array of rigid oblong metallic bodies having a tensile strength of 1140 MPa or greater, wherein the orientation of one or more of said metallic bodies in said second metallic array is structurally complementing to the orientation of one or more of said metallic bodies in said first metallic array and spaces between the metallic bodies within each of said first and second metallic arrays are filled with a non-metallic filler;
    two exterior non-metallic layers comprised of polymer fabric or carbon fiber contiguously residing on an exterior side of said component; and
    a separating non-metallic layer comprised of polymer fabric or carbon fiber situated contiguously between said first and second metallic arrays;
    wherein said first and second metallic arrays and said exterior and separating non-metallic layers are arranged in contiguous alternating layers, starting and ending with a non-metallic layer, to form a solid composite material having a non-metallic exterior surface.

10. The structural element according to claim 9, wherein the orientation of one or more of said metallic bodies in said second metallic array is substantially perpendicular to the orientation of one or more of said metallic bodies in said first metallic array.

11. The structural element according to claim 9, wherein said metallic bodies have a substantially rectangular cross section, such that said metallic bodies have at least one flat surface facing an exterior surface.

12. The structural element according to claim 9, wherein said layers and arrays are attached to each other by an adhesive substance.

13. The structural element according to claim 9, wherein said metallic arrays are continuous metallic arrays.

14. The structural element according to claim 12, wherein at least a portion of said metallic bodies are individually wrapped by a strip of polymer fabric or carbon fiber, prior to adhesion to said non-metallic layers.

15. The structural element according to claim 9, wherein one or more of said metallic bodies are arranged and connected such that they form a pre-planned electric circuit.

16. An airplane wing spar comprised of:
a spar for providing structural integrity to an airplane wing comprising:
first and second metallic arrays composed of an array of rigid oblong metallic bodies having a tensile strength of 1140 MPa or greater, wherein the orientation of one or more of said metallic bodies in said second metallic array is structurally complementing to the orientation of one or more of said metallic bodies in said first metallic array and spaces between the metallic bodies within each array are filled with a non-metallic filler;
two exterior non-metallic layers comprised of polymer fabric or carbon fiber contiguously residing on an exterior side of said spar; and
a separating non-metallic layer comprised of polymer fabric or carbon fiber situated contiguously between said first and second metallic arrays;
wherein said metallic arrays and said exterior and separating non-metallic layers are arranged in contiguous alternating layers, starting and ending with a non-metallic layer, to form a solid composite material having a non-metallic exterior surface.

17. The airplane wing spar according to claim 16, wherein the orientation of one or more of said metallic bodies in said second metallic array is substantially perpendicular to the orientation of one or more of said metallic bodies in said first metallic array.

18. The airplane wing spar according to claim 16, wherein said metallic bodies have a substantially rectangular cross section, such that said metallic bodies have at least one flat surface facing an exterior surface.

19. The airplane wing spar according to claim 16, wherein said layers and arrays are attached to each other by an adhesive substance.

20. The airplane wing spar according to claim 16, wherein said metallic arrays are continuous metallic arrays.

21. The airplane wing spar according to claim 19, wherein at least a portion of said metallic bodies are individually wrapped by a strip of polymer fabric or carbon fiber, prior to adhesion to said non-metallic layers.

22. The airplane wing spar according to claim 16, wherein one or more of said metallic bodies are arranged and connected such that they form a pre-planned electric circuit.

* * * * *